(12) United States Patent
Nagpal et al.

(10) Patent No.: US 9,794,300 B2
(45) Date of Patent: Oct. 17, 2017

(54) METHOD AND SYSTEM FOR REDUCING MESSAGE PASSING FOR CONTENTION DETECTION IN DISTRIBUTED SIP SERVER ENVIRONMENTS

(71) Applicant: INTERNATIONAL BUSINESS MACHINES CORPORATION, Armonk, NY (US)

(72) Inventors: Abhinay R. Nagpal, Pune (IN); Sandeep R. Patil, Pune (IN); Sri Ramanathan, Lutz, FL (US); Gandhi Sivakumar, Victoria (AU); Matthew B. Trevathan, Roswell, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/607,474

(22) Filed: Jan. 28, 2015

(65) Prior Publication Data

US 2015/0215341 A1    Jul. 30, 2015

Related U.S. Application Data

(63) Continuation of application No. 12/949,151, filed on Nov. 18, 2010, now Pat. No. 8,977,730.

(51) Int. Cl.
*G06F 15/173* (2006.01)
*H04L 29/06* (2006.01)
(Continued)

(52) U.S. Cl.
CPC ...... *H04L 65/1006* (2013.01); *H04L 41/0816* (2013.01); *H04L 69/40* (2013.01)

(58) Field of Classification Search
CPC ................... H04L 65/1006; H04L 41/0816; H04L 69/40; H04L 29/06; H04L 12/24
See application file for complete search history.

(56) References Cited

U.S. PATENT DOCUMENTS 5,459,871 A * 10/1995 Van Den Berg .... G06F 11/1402
710/200
5,682,537 A * 10/1997 Davies .................... G06F 9/524
707/999.008
(Continued)

FOREIGN PATENT DOCUMENTS

CN        101657766 A      2/2010

OTHER PUBLICATIONS

Chinese Office Action dated Dec. 4, 2013, 6 ppages, cited and considered in parent U.S. Appl. No. 12/949,151.
(Continued)

*Primary Examiner* — Cheikh Ndiaye
(74) *Attorney, Agent, or Firm* — Christopher K. McLane; Andrew M. Calderon; Roberts Mlotkowski Safran Cole & Calderon, P.C.

(57) ABSTRACT

A method, a system, and a computer program product are provided for reducing message passing for contention detection in distributed SIP server environments. The method is implemented in a computer infrastructure having computer executable code tangibly embodied on a computer readable storage medium having programming instructions operable to determine that a first site is waiting for a first object locked by a second site. The programming instructions are further operable to determine that a third site is waiting for a second object locked by the first site, and to send a first probe to the second site to determine whether the second site is waiting. A second probe is received and indicates that a site is waiting for an object locked by the first site. The second probe (Continued)

further indicates a deadlock in a distributed server environment to be resolved.

20 Claims, 6 Drawing Sheets

(51) Int. Cl.
  *H04L 29/14*    (2006.01)
  *H04L 12/24*    (2006.01)

(56) References Cited

U.S. PATENT DOCUMENTS

| | | | |
|---|---|---|---|
| 5,845,117 A | 12/1998 | Fujita | |
| 7,403,945 B2 | 7/2008 | Lin et al. | |
| 7,512,606 B2 | 3/2009 | Laonipon et al. | |
| 7,735,089 B2* | 6/2010 | Chan | G06F 9/524 710/200 |
| 7,765,553 B2 | 7/2010 | Douceur et al. | |
| 2006/0101081 A1* | 5/2006 | Lin | G06F 17/30362 |
| 2006/0206901 A1* | 9/2006 | Chan | G06F 9/524 718/107 |
| 2008/0127232 A1* | 5/2008 | Langen | H04L 29/12188 719/328 |
| 2008/0282244 A1 | 11/2008 | Wu et al. | |

OTHER PUBLICATIONS

IBM Corp., "Method and Algorithm . . . distributed database", Apr. 9. 2008, IP.com PriorArtDatabase, pp. 1-4.

Farajzadeh et al., "An Efficient Generalized . . . Distributed Systems", IEEE, 2005, The Fifth Int'l Conf. on Computer and Information Technology, 5 pages.

Cordoba et al., "A Low Communication Cost . . . Resolution", IEEE, Euro-PDP 2003, 8 pages.

Wright et al., "SIP server performance on multicore systems", Jan./Feb. 2010, vol. 54, No. 1, Paper 7, pp. 1-12.

Huang et al., "On Mechanisms for Deadlock Avoidance in SIP Servlet Containers", IPTComm 2008, LNCS 5310, 2008, pp. 196-216.

Knapp, "Deadlock Detection in Distributed Databases", ACM Computing Surveys, vol. 19, No. 4, Dec. 1987, pp. 303-328.

Obermarck, "Distributed Deadlock Detection Algorithm", ACM Transaction on Database Systems, vol. 7, No. 2, Jun. 1982, pp. 187-208.

Oracle Berkeley DB., "Getting Started with Transaction Processing for Java", Mar. 30, 2010, 124 pages.

Gartner, Inc., "Gartner Says a Green Data Centre Means More than Energy Efficiency", http://www.gartner.com/it/page.jsp?id=781012 &format=print, Oct. 20, 2008, pp. 1-2.

IBM Corp., "IBM Unveils Plan . . . 'Green' Technology and Services", http://www-03.ibm.com/press/us/en/pressrelease/21524. wss, May 10, 2007, pp. 1-6.

IBM Corp., "IBM Project Big Green Tackles Global Energy Crisis", http://www-03.ibm.com/press/us/en/pressrelease/24395.wss, Jun. 11, 2008, pp. 1-6.

Fichera et al., "Power . . . Center" (Executive Summary), http://www.forrester.com/rb/Research/power_and_cooling_heat_up_data_center/q/id/38746/t/2, Mar. 8, 2006, pp. 1-2.

* cited by examiner

| Object | Deadlock Query Ref. Count | S1.TX1 | S1.TX2 | S2.TX3 | S3.TX4 | S4.TX5 |
|---|---|---|---|---|---|---|
| O1 | 100 | 1 | 2 | 0 | 1 | 1 |
| O2 | 100 | 1 | 2 | 0 | 1 | 1 |
| O3 | 100 | 2 | 0 | 0 | 1 | 0 |
| O4 | 100 | 0 | 0 | 1 | 2 | 1 |
| O5 | 100 | 2 | 1 | 0 | 2 | 1 |
| O6 | 100 | 0 | 0 | 1 | 2 | 2 |
| O7 | 100 | 2 | 0 | 0 | 1 | 0 |
| O8 | 100 | 0 | 1 | 2 | 2 | 1 |
| O9 | 100 | 2 | 1 | 0 | 2 | 2 |
| O10 | 100 | 2 | 0 | 0 | 1 | 0 |

METHOD AND SYSTEM FOR REDUCING MESSAGE PASSING FOR CONTENTION DETECTION IN DISTRIBUTED SIP SERVER ENVIRONMENTS

TECHNICAL FIELD

The present invention generally relates to contention detection in Session Initiation Protocol (SIP) server environments, and more particularly, to a method, a system, and a computer program product for reducing message passing for contention detection in distributed SIP server environments.

BACKGROUND

Voice over Internet Protocol (VoIP) includes various technologies for delivery of voice communications and multimedia sessions over Internet Protocol (IP) networks, such as the Internet and cellular networks. One of these technologies may be the Session Initiation Protocol (SIP), which is a signaling protocol for creating, modifying, and terminating the voice communications and the multimedia sessions. A VoIP service may include multiple features or applications, such as call waiting, call forwarding, and call merge. These applications may be implemented as SIP servlets (applications) in SIP application servers that reside in nodes across the IP networks.

Each of the SIP application servers may include a container that manages various concerns of a VoIP application. For example, upon receiving a message for the VoIP application from another VoIP application, the container may dispatch a dedicated control thread, or transaction, to process the message. In doing so, the thread may access data in the server's local database, or may create and use data to be stored in the local database. To prevent data corruption, the container may lock the accessed data from being accessed by another control thread prior to processing the message.

However, these container actions are unknown to containers in other SIP application servers. This may cause problems in a distributed SIP server environment, where a control thread in one server may want to access data in another server that may be locked by a local control thread. In addition, transferring information regarding all actions of containers across multiple SIP application servers may involve transferring complex and large messages and transferring these messages frequently between the containers. Standard specifications for SIP containers are silent regarding these synchronization issues.

SUMMARY

In a first aspect of the invention, a method is implemented in a computer infrastructure having computer executable code tangibly embodied on a computer readable storage medium having programming instructions operable to determine that a first site is waiting for a first object locked by a second site. The programming instructions are further operable to determine that a third site is waiting for a second object locked by the first site, and to send a first probe to the second site to determine whether the second site is waiting. A second probe is received and indicates that a site is waiting for an object locked by the first site. The second probe further indicates a deadlock in a distributed server environment to be resolved.

In another aspect of the invention, a system is implemented in hardware, including a transaction manager operable to select at least a first transaction and a first object as a candidate for detecting and resolving a deadlock in a distributed server environment, and determine that a first site is waiting for the first object locked by a second site. The transaction manager is further operable to determine that a third site is waiting for a second object locked by the first site, and send a first probe to the second site to determine whether the second site is waiting. A second probe is received and indicates that a site is waiting for an object locked by the first site. The second probe further indicates the deadlock in the distributed server environment to be resolved.

In an additional aspect of the invention, a computer program product includes a computer usable storage medium having readable program code embodied in the storage medium, the computer program product includes at least one component operable to receive a first probe from a first site to determine whether a second site is waiting for an object locked by a third site. The at least one component is further operable to determine that the second site is waiting for the object locked by the third site, and send a second probe to the third site to determine whether the third site is waiting.

In a further aspect of the invention, a computer system for detecting and resolving a deadlock in a distributed server environment includes a CPU, a computer readable memory and a computer readable storage media. The system further includes first program instructions to determine that a first site is waiting for a first object locked by a second site, and second program instructions to determine that a third site is waiting for a second object locked by the first site. Third program instructions send a first probe to the second site to determine whether the second site is waiting, and fourth program instructions receive a second probe indicating that a site is waiting for an object locked by the first site. The second probe further indicates the deadlock in the distributed server environment to be resolved. The first, second, third, and fourth program instructions are stored on the computer readable storage media for execution by the CPU via the computer readable memory.

In another aspect of the invention, a method of deploying a system for detecting and resolving a deadlock in a distributed server environment includes providing a computer infrastructure, being operable to obtain a local Wait-For Graph (WFG) at a first site. The computer infrastructure is further operable to determine that a first transaction at the first site is waiting for a first object locked by a second transaction at a second site based on the local WFG at the first site. A third transaction at a third site is determined to be waiting for a second object locked by the first transaction at the first site, and a first probe is sent to the second site to determine whether the second site is waiting. A reverse probe is received and indicates that the second site is not waiting. The reverse probe further indicates an absence of deadlocks in the distributed server environment. A second probe is received and indicates that a site is waiting for an object locked by the first site. The second probe further indicates the deadlock in the distributed server environment to be resolved. The computer infrastructure is also operable to resolve the deadlock in the distributed server environment comprising victimizing the first transaction at the first site that is waiting for the first object.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
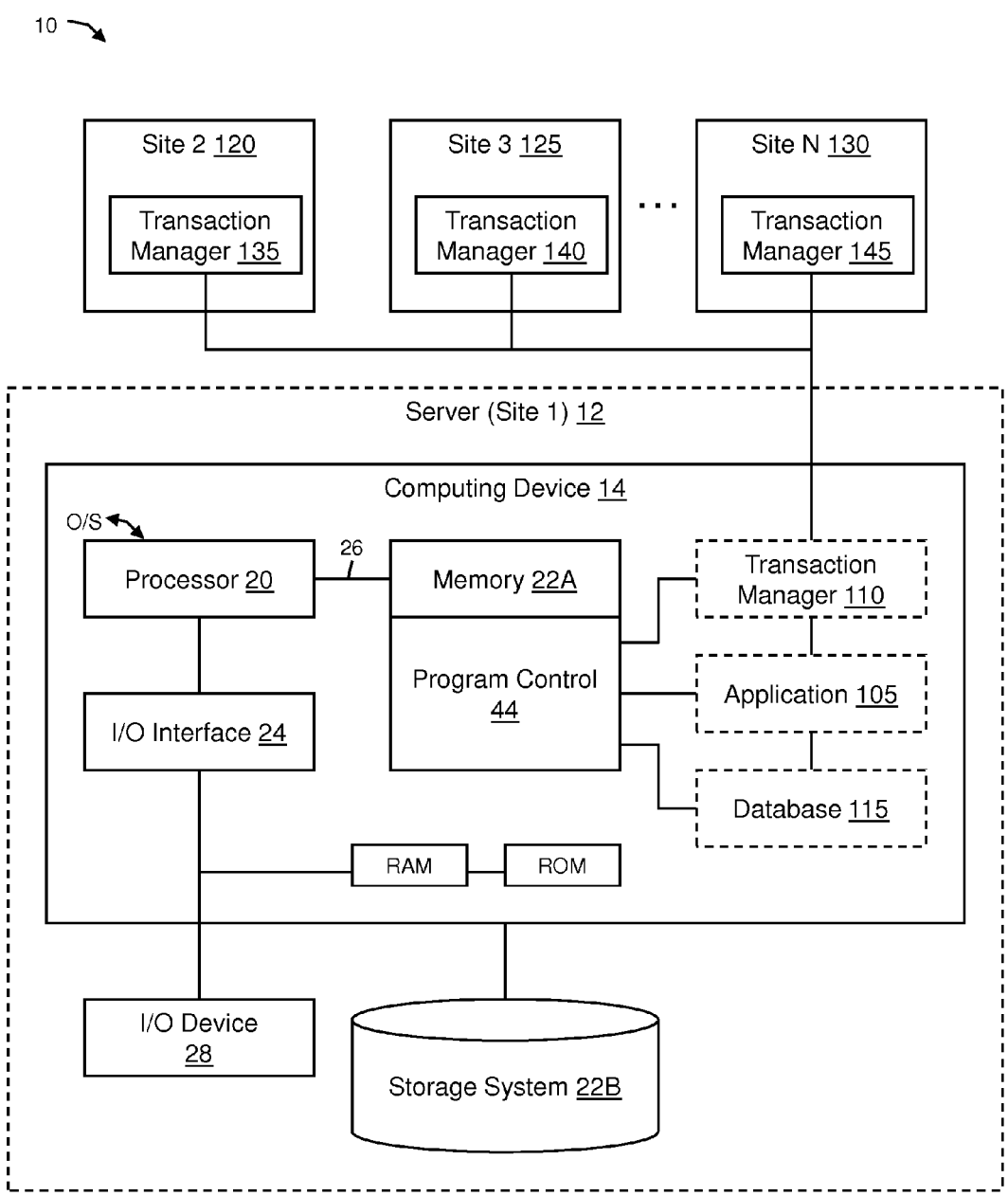
FIG. 1 is an illustrative environment for implementing the steps in accordance with aspects of the invention.

The present invention generally relates to contention detection in Session Initiation Protocol (SIP) server environments, and more particularly, to a method, a system, and a computer program product for reducing message passing for contention detection in distributed SIP server environments. More specifically, the invention is directed to generating, counting, and selecting transactions and objects in a distributed database as candidates for detecting and resolving data contention (e.g., data lock issues) in a distributed SIP server environment. The candidate transactions and objects are selected based on data lock history of the objects in the database. The selection of the candidate transactions and objects is also based on obtaining dependence between transaction initiators and objects and forming reducts (e.g., smaller sets) of such initiators and objects that may be involved in data locks.

After selecting the candidate transactions and objects, the method and the system of the invention includes detecting and resolving the data lock issues involving the candidate objects via probing and reverse probing transaction managers at servers or sites in the distributed SIP server environment. In particular, a transaction manager at one site is probed (e.g., queried) based on a locked object at that one site being waited on by a transaction at another site, to see if there is a data lock issue between the two sites. In other words, the invention takes into account the likelihood of an actual data lock issue happening for a given set of objects locked by a given set of transactions.

Advantageously, the invention provides detection and resolution of the data lock issues without having to pass large and complex messages regarding all transactions between all of the sites in the distributed SIP server environment. In fact, through the probing based on transactions waiting for objects at the individual sites, messages do not have to be passed between sites without relevant objects and transactions and, thus, not involved in any data lock issues. Additionally, by selecting the candidate transactions and objects, the detecting and resolving of the data lock issues is further focused on only transactions and objects that generally would have data lock issues with each other. This invention greatly increases the efficiency and processing power of all sites in the distributed SIP server environment.

Further, the invention takes a workload and transaction information along with data lock history as input, obtains dependence between transactions and objects, and forms reducts of such transactions and objects with high level of entropy. The invention uses heuristics (e.g., data lock history) and not only bypasses the need to have an extra global Wait-For Graph (WFG) for detection of any data lock but also reduces the message passing. This is accomplished by setting probing and reverse probing thresholds depending upon the object and transaction dependence, or the likelihood of an actual deadlock happening for a given set of objects locked by a given set of transactions.

System Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1).

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with the external I/O device/resource 28 and a storage system 22B. For example, the I/O device 28 can comprise any device that enables an individual to interact with the computing device 14 (e.g., user interface) or any device that enables the computing device 14 to communicate with one or more other computing devices using any type of communications link. The external I/O device/resource 28 may be for example, a handheld device, PDA, handset, keyboard etc.

In general, the processor 20 executes computer program code (e.g., program control 44), which can be stored in the memory 22A and/or storage system 22B. Moreover, in accordance with aspects of the invention, the program control 44 controls an application 105 and a transaction manager 110, e.g., the processes described herein. The application 105 and the transaction manager 110 can be implemented as one or more program code in the program control 44 stored in memory 22A as separate or combined modules. Additionally, the application 105 and the transaction manager 110 may be implemented as separate dedicated processors or a single or several processors to provide the function of these tools. While executing the computer program code, the processor 20 can read and/or write data to/from memory 22A, storage system 22B, and/or I/O interface 24. The program code executes the processes of the invention, for example, detecting and resolving data lock issues in the distributed SIP server environment. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

The server 12 may be a SIP application server in an IP network that includes the application 105 and the transaction manager 110. The application 105 may be, for example, a VoIP application (e.g., call waiting, call forwarding, and call merge) implemented as a SIP servlet. As discussed above, the application 105 is controlled by the program control 44. Further, the application 105 is in communication with and managed by the transaction manager 110, which may be implemented as a SIP container and is also controlled by the program control 44.

The transaction manager 110 manages various concerns of the application 105. For example, upon receiving a message for the application 105 from another VoIP application, the transaction manager 110 may initiate in the application 105 a dedicated control thread, or transaction, to process the message. In doing so, the transaction may access data (e.g., objects) in a database 115 of the server 12, or may create and use data to be stored in the database 115, which may be implemented in, for instance, the storage system 22B and/or a separate memory of the server 12. To prevent data corruption, the transaction manager 110 may lock the accessed data from being accessed by another transaction prior to processing the message.

In a distributed SIP server environment (e.g., the environment 10), the transaction manager 110 in the server 12, called "Site 1," may be in communication with multiple external sites, for example, Site 2 (120), Site 3 (125), and Site N (130). N is a number of total sites in the environment 10. Each of these sites 120, 125, 130 may be implemented as a SIP application server in the IP network and may include at least one VoIP application that accesses its own database and databases at the other sites. For instance, the application at Site 1 (12) may access the database 115 and the databases at the Site 2 (120), the Site 3 (125), and the Site N (130). In addition, the sites 120, 125, and 130 include transaction managers 135, 140, and 145, respectively. Each of the transaction managers 135, 140, and 145 manages its respective applications and are in communication with each other, along with the transaction manager 110.

Figures 2, 3:
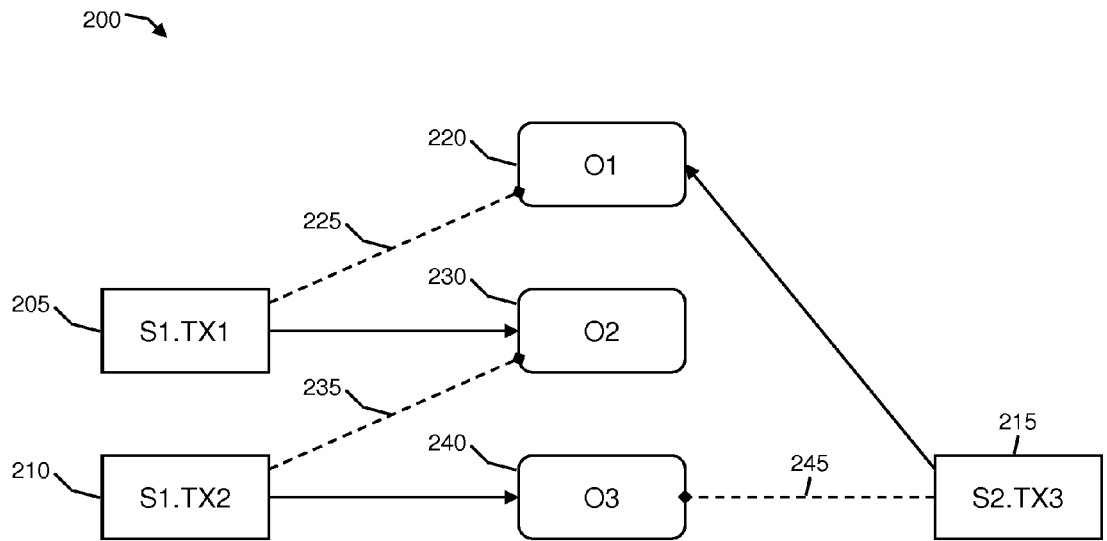
FIG. 2 shows an exemplary block diagram of when two transactions in a distributed Session Initiation Protocol (SIP) server environment are deadlocked in accordance with aspects of the invention.
FIG. 3 shows an exemplary table including a set of all objects and transactions in a distributed database in accordance with aspects of the invention.

FIG. 2 shows an exemplary block diagram 200 of when two transactions in a distributed SIP server environment are deadlocked in accordance with aspects of the invention. Specifically, the block diagram 200 depicts three transactions 205, 210, and 215. The first transaction 205 ("S1.TX1") is initiated by the transaction manager 110 in FIG. 1 at the Site 1 ("S1"). The second transaction 210 ("S1.TX2") is also initiated by the transaction manager 110 at the S1. The third transaction 215 ("S2.TX32") is initiated by the transaction manager 135 in FIG. 1 at the Site 2 ("S2").

Initially, the first transaction 205 wants to obtain access to data in a database, particularly, a first object 220 ("O1") and requests and receives a lock 225 for that object. The lock 225 allows the transaction manager 110 in FIG. 1 to provide the application 105 with its transactional isolation guarantees by ensuring that no other transaction can read and/or modify the first object 220. When locking occurs, a transaction (a "locker") holds a lock on a database record (a "locked object"). A lock may be implemented in a transaction manager as a data structure that locks an object represented in the data structure.

Next, to complete the transaction, the first transaction 205 wants to obtain access to a second object 230 ("O2") but must wait to obtain access to the second object 230 since the second transaction 210 holds a lock 235 on the second object 230. This relationship between the first transaction 205 and the second transaction 210 may be shown in a Wait-For Graph (WFG) at the S1, as follows:

S1.TX1-->S1.TX2, where the "-->" represents that the first transaction 205 ("S1.TX1 ") is waiting for the second transaction 210 ("S1.TX2") to release the second object 230 that the first transaction 205 wants to obtain access to.

Meanwhile, the second transaction 210 wants to obtain access to a third object 240 ("O3") but must wait to obtain access to the third object 240 since the third transaction 215 holds a lock 245 on the third object 240. The WFG at the S1 may be updated, as follows:

S1.TX1-->S1.TX2-->S2.TX3.

When the third transaction 215 wants to obtain access to the first object 220, a deadlock occurs between the transactions 205, 210, 215 since they are blocked by each other. In other words, each of the transactions 205, 210, 215 is waiting on an object held or locked by another transaction and, thus, will not release a lock that is blocking the other transactions. When a deadlock occurs, there is no possibility of transactions involved in the deadlock ever making forward process (e.g., obtaining access to data) unless some outside agent takes action to break the deadlock. Deadlocks can use up a server's resources, especially its processor power, wasting it unnecessarily.

Each site may be represented by and construct a local WFG of its waiting transactions. The WFG at the S2 is depicted, as follows:

S2.TX3-->S1.TX1.

Accordingly, a global WFG at all sites, include the S1 and the S2, may be shown, as follows:

S1.TX1-->S1.TX2-->S2.TX3-->S1.TX1.

As depicted in the global WFG, a cycle in a WFG indicates that a deadlock has occurred in a distributed SIP server environment. At least one of the above transactions 205, 210, 215 has to be victimized, or terminated, to resolve the deadlock.

To efficiently detect and resolve deadlocks in a distributed SIP server environment, without having to construct, maintain, and transfer all of the potentially large and complex WFG's discussed above, a method, a system, and a computer program product of the present invention may be implemented. In particular, the method, the system, and the computer program product of the present invention may be implemented in each of the transaction managers 110, 135, 140, 145 in FIG. 1. In operation, the present invention includes a transaction manger (e.g., the transaction managers 110, 135, 140, 145) at a site Sn (e.g., the Site 1 (12), the Site 2 (120), the Site 3 (125), and the Site N (130)). The transaction manager may first initiate a process of generating, counting, and selecting transactions and objects in a distributed database as candidates for detecting and resolving deadlocks in the distributed SIP server environment.

Specifically, the transaction manager at the site Sn first generates a set of all transactions and objects in the distributed database, the set being possibly large in size. FIG. 3 shows an exemplary table 300 including a set of all objects O1-O10 and all transactions S1.TX1, S1.TX2, S2.TX3, S3.TX4, and S4.TX5 in a distributed database in accordance with aspects of the invention. The objects may reside in databases at the site Sn or other sites. The transaction manager then counts (e.g., keeps track of) a number of requests or queries that reference an object over a predetermined period of time (e.g., an evaluation interval), for each object in the distributed database. This number is called a deadlock query reference count, as shown in the table 300. For example, in the table 300, each of the objects O1-O10 has a deadlock query reference count of 100 queries during the evaluation interval. In embodiments, the transaction manager may also count a number of requests or queries a single transaction makes of an object over the evaluation interval, for each object and transaction in the distributed database (e.g., a transaction query reference count). This refers to numbers in the table 300 underneath the transactions S1.TX1, S1.TX2, S2.TX3, S3.TX4, and S4.TX5. For instance, in the table 300, the transaction S1.TX1 has made 1 query of objects O1 and O2, and 2 queries of objects O3, O5, O7, O9, and O10, during the evaluation interval. The transaction query reference count also shows that a transaction has depended on a certain object.

In embodiments, the transaction manager may generate the set of all transactions and objects based on deadlock history during an evaluation interval. For instance, during an evaluation interval, the transaction manager may generate a log of all deadlocks that occurs and may include information of these deadlocks, such as transaction names, transaction ID's, dates and/or times of the deadlocks, and objects involved in the deadlocks. The transaction manager may then generate the set of all transactions and objects based on the generated log of all deadlocks that occurred during the evaluation interval.

After the evaluation interval, the transaction manager selects transactions and objects from the set of all transactions and objects that are candidates for detecting and resolving deadlocks in the distributed SIP server environment. In embodiments, one of the transaction and object pairs may be considered a candidate if it has a deadlock query reference count greater than a predetermined threshold and a transaction query reference count greater than zero. The transaction and object pair is considered a candidate since the pair is involved in deadlock situations frequently, e.g., more than a predetermined threshold. In embodiments, the transaction manager may select the candidate transactions and objects via pruning the non-candidate transactions and objects from the set of all transactions and objects. The selecting of the transactions and objects from the set of all transactions and objects results in a set of candidate transactions and objects.

In embodiments, the transaction manager may select candidate transactions and objects that may be involved in deadlocks in the set of all transactions and objects via reducing transactions and objects in the set. This is achieved by comparing equivalence relations generated by sets of transactions and objects. Transactions and objects are removed so that the reduced set provides the same predictive capability of the decision feature as the original set. The reduced set is defined as a subset of minimal cardinality $R_{min}$ of a conditional transaction and object set C such that:

$$\gamma_R(D) = \gamma_C(D); \quad (1)$$

$$R = \{X : X \subseteq C; \gamma_X(D) = \gamma_C(D)\}; \text{ and} \quad (2)$$

$$R_{min} = \{X : X \in R; \forall Y \in R; |X| \leq |Y|\}, \quad (3)$$

where X and Y are different candidate transactions and objects within the reduced set $R_{min}$.

This yields a much coarser equivalence-class structure including a set of dependent transactions as follows:

{S1.TX1,S2.TX3}.

The equivalence-class structure also includes sets of dependent objects as follows:

{O1,O2};

{O3,O5,O7,O9,O10};

{O4,O6,O8}.

In embodiments, the transaction manager may reduce transactions and objects in the set of all transactions and objects by determining a total number of deadlocks and for each of the transactions and objects, a percentage of the total number of deadlocks that the transaction or object is involved in. Then, the transaction manager may prune the transactions or objects from the set of all transactions and objects that are involved in less than a predetermined threshold percentage of deadlocks. For example, the transaction manager may determine that there are 100 deadlocks during an evaluation interval, and that transactions deadlock on an object F for 40% of the deadlocks and an object Z for only 1% of the deadlocks. Accordingly, the transaction manager may prune the object Z from the set of all transactions and objects.

In embodiments, the reduced set of transactions and objects may be associated with a certain entropy, e.g., a size of information. That is, the reduced set of transactions and objects may be associated with a certain size or weight, where the higher the size or weight, the greater the probability of the set contributing to a deadlock, for example. By generating the reduced set of transactions and objects to include those that may be candidates for deadlocks, a process of detecting and resolving deadlocks in the distributed SIP server environment, as described herein, may be achieved with higher accuracy.

Figure 4:
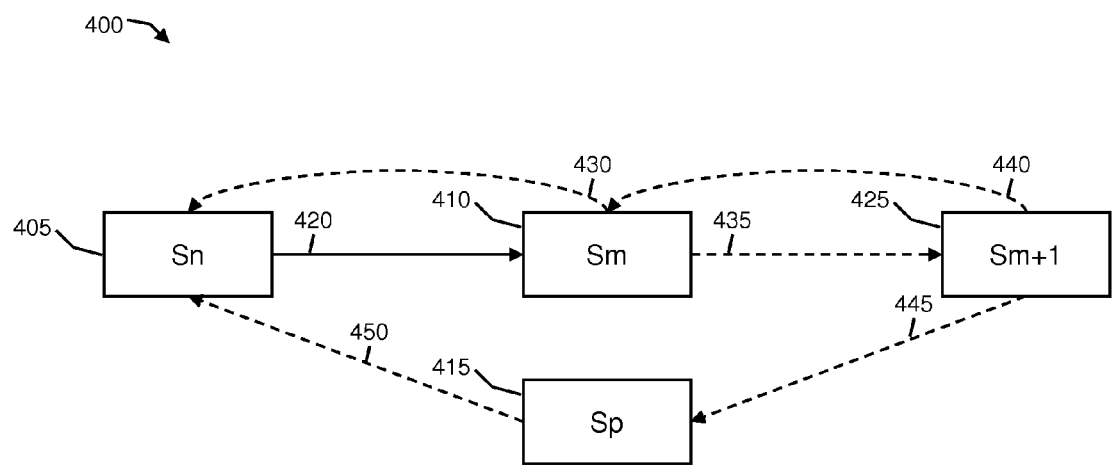
FIG. 4 shows an exemplary block diagram of a site Sn initiating a process of detecting and resolving deadlocks in a distributed SIP server environment in accordance with aspects of the invention.

After the Sn transaction manager completes the process of selecting objects as candidates, the Sn transaction manager may initiate the process of detecting and resolving deadlocks in the distributed SIP server environment. FIG. 4 shows an exemplary block diagram 400 of the site Sn ("405") initiating this process in accordance with aspects of the invention. The site Sn 405 first checks its local WFG for possible deadlocks. Specifically, for every local transaction TXn in the local WFG, the site Sn 405 determines whether the transaction TXn is waiting to access an object Om locked or held by a remote transaction TXm at a site Sm 410.

In embodiments, the site Sn 405 may determine whether the transaction TXn is waiting to access the object Om for greater than a predetermined period of time (e.g., 10 seconds). This period of time where the transaction TXn is waiting for the object Om may be inversely proportional to a probability of a deadlock in the set of candidate transactions and objects, which may be determined by the set's associated entropy or weight. In addition, the period of time where the transaction TXn is waiting for the object Om may be determined based on how crucial the object Om is from, for example, a business perspective, as compared to other objects. For instance, if the object Om is crucial, then the waiting time for the transaction TXn may be determined to be a lesser amount such that the object Om is checked for deadlocks more frequently. Crucial objects may be predetermined by users of transaction managers.

In embodiments, the transaction TXn and the object Om may have to be a selected candidate pair (e.g., in the set of candidate transactions and objects) for the process of detecting and resolving deadlocks. The site Sn 405 also determines whether a remote transaction TXp at a site Sp 415 is waiting to access an object On held by the transaction TXn.

If one of the determinations is false (e.g., the transaction TXn is not waiting to access the object Om), then the site Sn 405 determines there is no deadlock in the distributed SIP server environment. However, if both of the determinations are true, then the site Sn 405 sends a probe 420 to the site Sm 410. The probe 420 includes data that identifies the site Sn 405, the transaction TXn, and the desired object Om. For example, data in all probes may include authenticated identification (e.g., username and password), IP addresses, port numbers, and/or other identification information to identify sites, transactions, and objects.

The site Sm 410 receives the probe 420 and determines whether the transaction TXm is waiting to access an object Om+1 held by a remote transaction TXm+1 at a site Sm+1 425. If the transaction TXm is not waiting to access the object Om+1, then the site Sm 410 sends a reverse probe 430 to the site Sn 405. The reverse probe 430 includes data that identifies the site Sn 405, the transaction TXn, and the object Om of the initial probe 420. The reverse probe 430 indicates to the site Sn 405 that there are no more locked objects to be found and, thus, that there is no deadlock in the distributed environment.

However, if the transaction TXm is waiting to access the object Om+1, then the site Sm 410 sends a probe 435 to the site Sm+1 425. The probe 435 includes data that identifies the site Sm 410, the transaction TXm, and the desired object Om+1. The site Sm+1 425 receives the probe 435. Like the site Sm 410, the site Sm+1 425 determines whether to send a reverse probe 440 indicating to the site Sm 410 that there are no more locked objects and no deadlock in the distributed environment, or to send a new forward probe to another site if a transaction TXm+1 at site Sm+1 425 is waiting to access an object at the another site.

If the transaction TXm+1 is waiting to access an object Op at the site Sp 415, then the site Sm+1 425 sends a probe 445 to the site Sp 415. The probe 445 includes data that identifies the site Sm+1 425, the transaction TXm+1, and the desired object Op. If the site Sp 415 receives the probe 445 from the site Sm+1 425, then the site Sp 415 sends a probe 450 to the site Sn 405 since the transaction TXp is the one waiting to access the object On at the site Sn 405. The probe 450 includes data that identifies the site Sp 415, the transaction Tp, and the desired object On. The probe 450 indicates to the site Sn 405 that there is a deadlock in the distributed environment since the site Sn 405 initiated the process of detecting deadlocks due to its waiting transaction yet receives a probe for an object held by the same waiting transaction. In other words, the probe 450 indicates that there is a deadlock in the distributed environment since the probe 450 indicates that there is a cycle of waiting transactions in the distributed environment.

If the site Sn 405 receives the probe 450, the site Sn 405 determines that there is a deadlock in the distributed environment and resolves the deadlock. In embodiments, the deadlock may be resolved by victimizing or terminating the local transaction TXn at the site Sn 405. In other embodiments, the deadlock may be resolved by victimizing transactions at both ends of the deadlock (e.g., the transactions TXn and TXp) and/or victimizing all transactions in the distributed environment. Through this process of detecting and resolving deadlocks in the distributed environment, potentially complex and large global WFG's of the distributed environment do not have to be constructed, maintained, and transferred between sites (e.g., the sites 405, 410, 415, and 425). Accordingly, this process of detecting and resolving deadlocks is more efficient in that it saves processing power and storage, and decreases message transferring in size per message and quantity of messages.

The following is exemplary pseudocode in accordance with aspects of the invention:

```
//Perform iterations, bottom up:
//iteration 1: find L1, all single items with Support > threshold
//iteration 2: using L1, find L2
//iteration i: using Li-1, find Li
//until no more locked itemsets can be found
//All sites in the distributed environment are capable of performing global deadlock detection.
//All sites participating in the distributed environment have local transaction managers, with their
//own local deadlock detection process.
//Each site in the distributed environment can send messages to any other site, for enquiring on a
//distributed deadlock.
//Each iteration i consists of two phases:
//1. candidate generation phase:
//Construct a candidate set of large itemsets, i.e. find all the items that could qualify for further
//consideration by examining only candidates in
//set Li-1*Li-1
//2. candidate counting and selection
//Count the number of occurrences of each candidate itemset
//Determine large itemsets based on predetermined support, i.e., select only candidates with
//sufficient support
//Interrupt_watchdog = Time interval after which a site will check whether any of its transactions
//is waiting on a remote resource
//Local_Timeltout = Lock timeout interval specified at the local database
//LWFG = Local Wait For Graph at site Sn
//Sn = Site identifier of the initiator site
//TXn = Identifier of the transaction that is waiting for a lock on some resource of a remote site
//Sm
//Om = Identifier of remote object resource in site Sm, for which transaction TXn is waiting
//Probe (Sn, TXn, Om) = The probe message that will be sent by the initiator site
//Reverse_Probe (Sn, TXn) = The 'no-deadlock' message that is sent by site Sk to site Sn, when
//it detects that condition 1 is false
//Set Lk is defined as the set containing the frequent k itemsets which satisfy
//Support > threshold
//Lk*Lk is defined as:
//Lk*Lk = {X U Y, where X, Y belong to Lk and | X ∩Y| = k-1}
//find all frequent objects involved in deadlocks
```

-continued

```
Contentionobjectfinder(database D of transactions, min_support) {
F1 = {frequent 1-itemsets}
k = 2
while Fk-1 ≠ EmptySet
    Ck= reductGeneration(Fk-1)
    for each transaction t in the database D{
        Ct= subset(Ck, t)
        for each candidate c in Ct {
            count c ++
        }
        Fk = {c in Ck such that countc ≥ min_support}
        k++
    }
    F = U k ≥ 1 Fk
}
//prune the candidate itemsets
reductGeneration(Fk-1) {
//Insert into Ck all combinations of elements in Fk-1 obtained by self-joining itemsets in Fk-1
//self joining means that all but the last item in the itemsets considered "overlaps," i.e., join items
//p, q from Fk-1 to make candidate
//k-itemsets of form p1p2 ...p k-1q1q2...q k-1 (without overlapping) such that p i =q i for i=1,2,
//.., k-2 and pk-1 < qk-1.
//Delete all itemsets c in Ck such that some (k-1) subset of c is not in Lk-1
}
//find all subsets of candidates contained in t
Subset(Ck, t) { }
//Interrupt_watchdog -> on every time elapsed
Interrupt_hanlder_siteS( ) {
For every local transaction TXn
Do
If ( TXn is waiting for a lock on a resource Om held by any transaction TXm at site Sm ) &&
(any remote transaction TXp at site Sp is waiting to acquire a lock on a resource On held by
TXn)
Then do
    Send Probe (Sn, Tn, Rm) to site Sm
    Wait for (Probe (Sn, Tn, *)) OR (Reverse_Probe (Sn, Tn))
//wait time is inversely proportional to a factor depending upon the object and transaction
//dependence, i.e., likelihood of an actual deadlock happening for a given set of objects locked
//by a given set of applications.
//Check membership of Subset(Ck, t)
    If Probe (Sn, Tn, *) received
    Then do
        Deadlock_detected = True
    Else
        Deadlock_detected = False
    End-Do
Else
    No deadlock detected in the current interrupt
End-Do
//On any site Sm receiving a probe message with initiator = site Sn , Transaction Id = TXn and
//Object Id = Om, for which TXn is waiting. Also, Transaction TXm holds the lock on Om
//Using the entropy measure we establish reducts of applications which generally would
//deadlock with each other , this is used to set the frequency of message passing to check for
//contention due to deadlocks
If (local transaction TXm is waiting for a lock on a object Om+1 at site Sm+1 held by any
transaction Tm+1)
Then do
    Send Probe (Sn, TXn, Om+1 ) to site Sm+1.
Else
    Send Reverse_Probe (Sn, TXn, Om) to site Sn.
End-Do
```

FLOW DIAGRAM

Figure 5A:
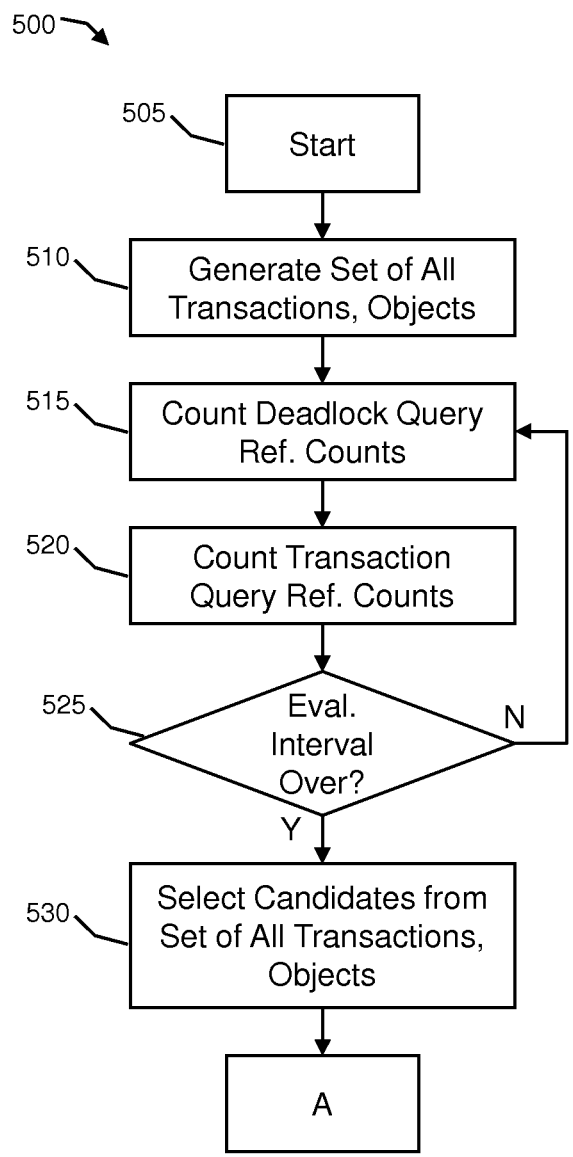
FIG. 5A shows an exemplary flow in accordance with aspects of the invention.
Figure 5B:
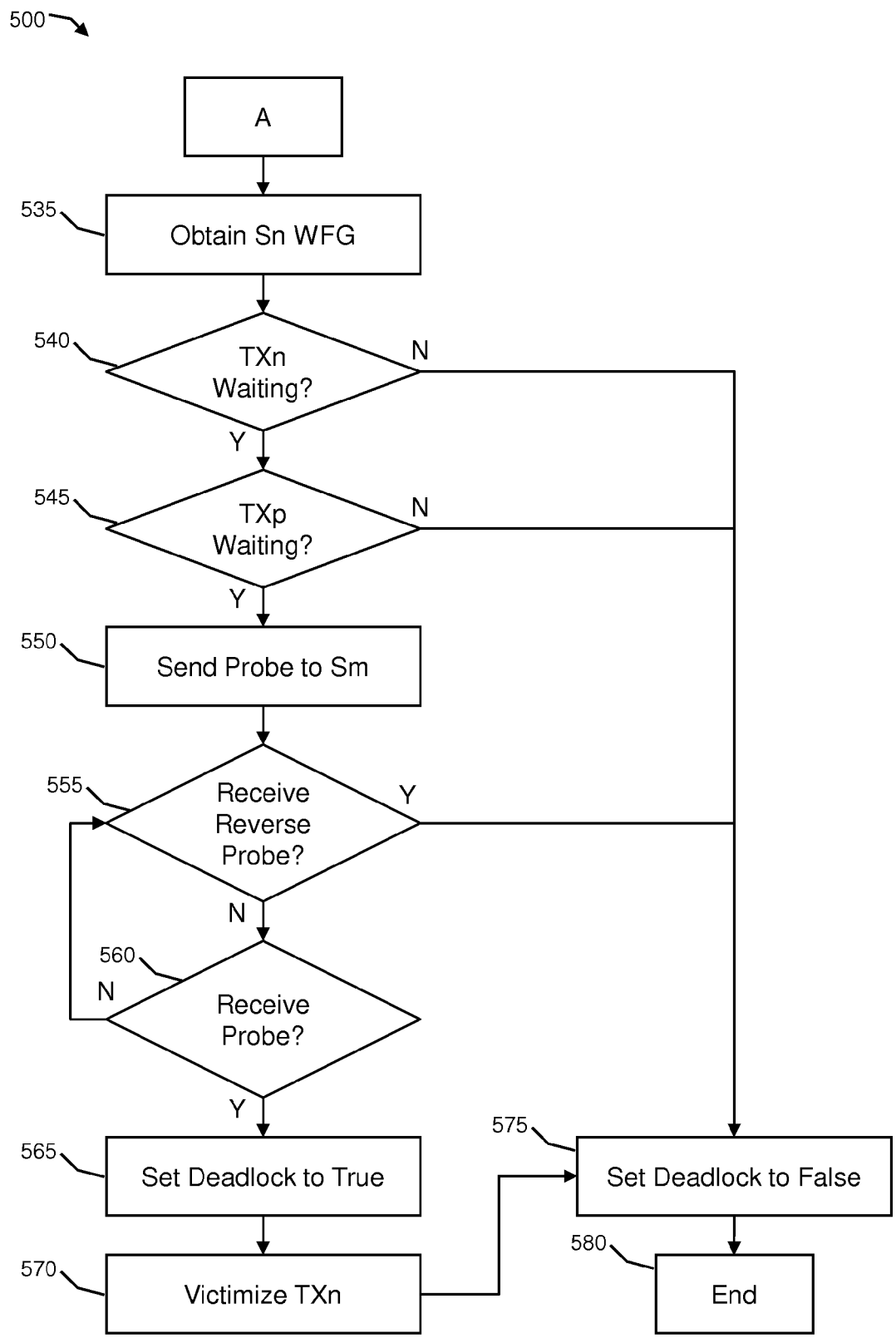
FIG. 5B shows a continuation of the exemplary flow of FIG. 4A in accordance with aspects of the invention.
Figure 6:
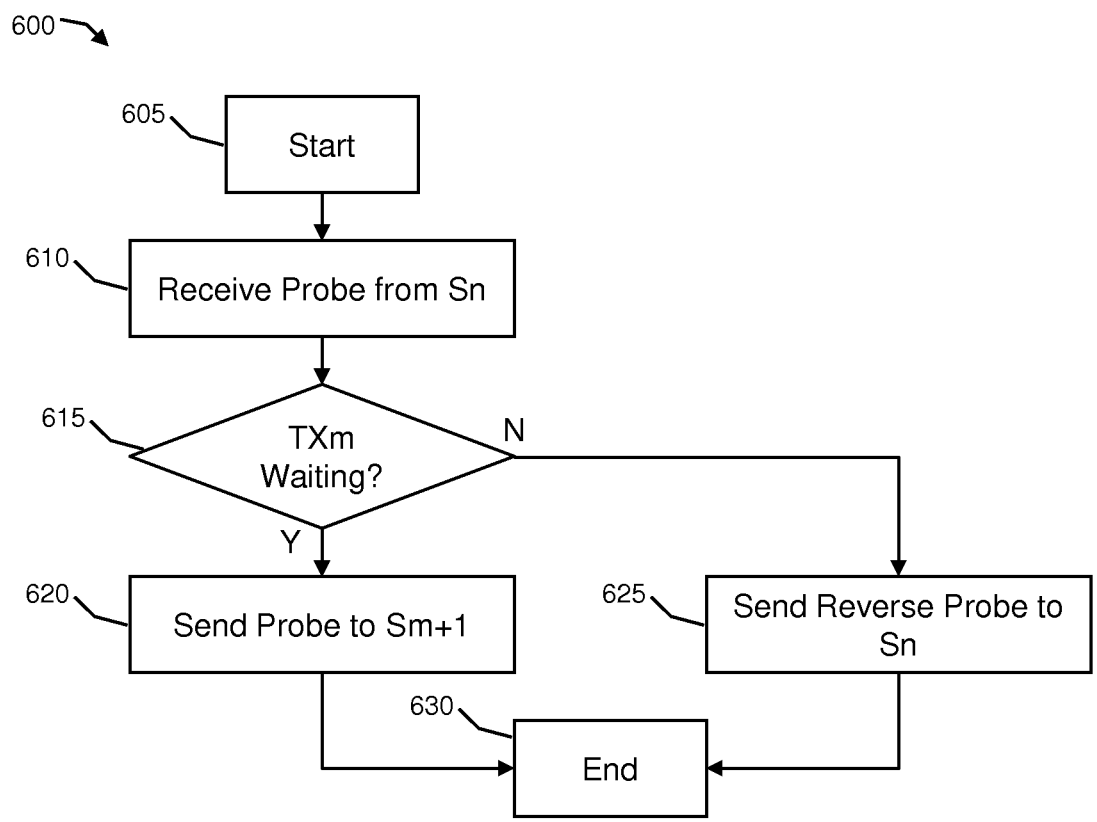
FIG. 6 shows another exemplary flow in accordance with aspects of the invention.

FIGS. 5A-5B and 6 show exemplary flows for performing aspects of the present invention. The steps of FIGS. 5A-5B and 6 may be implemented in the environment of FIG. 1, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 5A depicts an exemplary flow 500 for a process in accordance with aspects of the present invention. At step 505, the process starts. At step 510, a set of all transaction and objects in a distributed database is generated by a transaction manager at a site Sn. At step 515, the site Sn counts deadlock query reference counts for all objects in the generated set during an evaluation interval.

At step 520, the site Sn counts transaction query reference counts for all objects and transactions in the distributed database during the evaluation interval. At step 525, the site Sn determines whether the evaluation interval is over. If not, the process returns to step 515. If the evaluation interval is over, at step 530, the site Sn selects candidates from the set of all transactions and objects for the process of detecting and resolving deadlocks in the distributed SIP server environment. In embodiments, the site Sn may select the candidates from the set of all transactions and objects based on the counted deadlock query reference count and transaction query reference count. The process continues to step 535 of FIG. 5B, which is described below.

FIG. 5B depicts a continuation of the exemplary flow 500 for the process in accordance with aspects of the present invention. At step 535, the process starts, continuing from step 530 of FIG. 5A. Specifically, at step 535, a local WFG is obtained by the transaction manager at the site Sn. At step 540, using the local WFG, the site Sn determines whether a transaction TXn at the site Sn is waiting for an object Om held by a transaction TXm at a site Sm. In embodiments, the transaction TXn may have to be waiting for greater than a predetermined period of time, and the transaction TXn and the object Om may have to be a selected candidate pair from the set of all transactions and objects. If the transaction TXn is not waiting, the process continues at step 575.

If the transaction TXn is waiting, then at step 545, the site Sn determines whether a transaction TXp at a site Sp is waiting for an object On held by the transaction TXn. If the transaction TXp is not waiting, the process continues at step 575. If the transaction TXp is waiting, then at step 550, the site Sn sends a probe to the site Sm. At step 555, the site Sn determines whether a reverse probe has been received from the site Sm. If the reverse probe has been received, the process continues to step 575.

If the reverse probe has not been received, then at step 560, the site Sn determines whether a probe has been received from, for example, the site Sp that includes the transaction TXp waiting for the object On. If the probe has not been received, then the process continues at step 555. If the probe has been received, then at step 565, then the site Sn determines that there is a deadlock in the distributed environment (e.g., sets a deadlock parameter to true). At step 570, the site Sn victimizes the local transaction TXn to resolve the deadlock in the distributed environment. At step 575, the site Sn determines that there is no deadlock in the distributed system (e.g., sets the deadlock parameter to false). At step 580, the process ends.

FIG. 6 depicts another exemplary flow 600 for another process in accordance with aspects of the present invention. At step 605, the process starts. At step 610, a probe from a site Sn is received by a transaction manager at a site Sm. At step 615, the site Sm determines whether a transaction TXm at the site Sm is waiting for an object Om+1 held by a transaction TXm+1 at a site Sm+1. If the transaction TXm is waiting, then at step 620, the site Sm sends a probe to the site Sm+1. Otherwise, at step 625, the site Sm sends a reverse probe to the site Sn. At step 630, the process ends.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A method comprising:
obtaining, by a computer processor, a local Wait-For Graph (WFG) at a first site of a distributed Session Initiation Protocol (SIP) server environment;

determining, by the computer processor, that the first site is waiting for a first object locked by a second site of the distributed SIP server environment based on the local WFG at the first site;

sending, by the computer processor, a first probe to the second site to determine whether the second site is waiting;

receiving, by the computer processor, a second probe at the first site indicating that another site of the distributed server environment is waiting for an object locked by the first site, wherein the second probe further indicates to the first site a deadlock in the distributed SIP server environment to be resolved;

receiving, by the computer processor, an indication of the deadlock in the distributed SIP server environment to be resolved;

resolving, by the computer processor, the deadlock in the distributed SIP server environment by victimizing a first transaction at the first site that is waiting for the first object; and receiving, by the computer processor, heuristics to reduce message passing.

2. The method of claim 1, further comprising receiving a reverse probe indicating that the second site is not waiting, wherein the reverse probe further indicates an absence of deadlocks in the distributed SIP server environment.

3. The method of claim 1, further comprising generating a set of all transactions and objects in the distributed SIP server environment.

4. The method of claim 3, further comprising:
count a deadlock query reference count for each of the objects in the set of all transactions and objects; and
count a transaction query reference count for each of the transactions and objects in the set of all transactions and objects.

5. The method of claim 4, further comprising selecting at least the first transaction and the first object as a candidate for detecting and resolving the deadlock in the distributed SIP server environment based on the counting of the deadlock query reference counts and the counting of the transaction query reference counts.

6. The method of claim 1, further comprising:
generating a set of all transactions and objects in the distributed SIP server environment; and
selecting at least one transaction and a first object from the set of all transactions and objects as candidates for detecting and resolving the deadlock in the distributed SIP server environment.

7. A computer program product comprising a computer readable hardware storage device having readable program code stored on the computer readable hardware storage device, the program code comprising:
program code to obtain a local Wait-For Graph (WFG) at a first site of a distributed Session Initiation Protocol (SIP) server environment;
program code to determine that a first transaction at the first site is waiting for a first object locked by a second transaction at a second site based on the local WFG at the first site;
program code to send a first probe to the second site to determine whether the second site is waiting;
program code to receive a second probe at the first site indicating that another site of the distributed server environment is waiting for an object locked by the first site, wherein the second probe further indicates to the first site a deadlock in the distributed SIP server environment to be resolved;
program code to receive an indication of the deadlock in the distributed SIP server environment to be resolved;
program code to resolve the deadlock in the distributed SIP server environment by victimizing the first transaction at the first site that is waiting for the first object; and
program code to take into account a likelihood of an actual data lock issue happening for a given set of objects locked by a given set of transactions.

8. The computer program product of claim 7, further comprising:
program code to determine that the second site is not waiting for the object locked by a third site; and
program code to send a reverse probe to the first site indicating that the second site is not waiting for the object locked by the third site, wherein the reverse probe further indicates an absence of deadlocks in the distributed SIP server environment.

9. The computer program product of claim 7, wherein the program code further comprises:
program code to generate a set of all transactions and objects in the distributed SIP server environment; and
program code to select at least one transaction and one object from the set of all transactions and objects as candidates for detecting and resolving the deadlock in the distributed SIP server environment.

10. A computer system for detecting and resolving a deadlock in a distributed server environment, the system comprising:
one or more computer processors;
a computer readable hardware storage device; and
program instructions stored on the computer readable hardware storage device for execution by the one or more computer processors, the program instructions comprising:
program instructions to obtain a local Wait-For Graph (WFG) at a first site of a distributed Session Initiation Protocol (SIP) server environment;
program instructions to determine that the first site is waiting for a first object locked by a second site based on the WFG at the first site;
program instructions to send a first probe to the second site to determine whether the second site is waiting;
program instructions to receive a second probe at the first site indicating that another site of the distributed server environment is waiting for an object locked by the first site, wherein the second probe further indicates to the first site a deadlock in the distributed SIP server environment to be resolved;
program instructions to receive an indication of the deadlock in the distributed SIP server environment to be resolved;
program instructions to resolve the deadlock in the distributed SIP server environment by victimizing a transaction at the first site that is waiting for the first object; and
program instructions to obtain a dependence between transaction initiators and objects and forming reducts of such initiators and objects involved in data locks.

11. The computer system of claim 10, wherein the program instructions further comprise:
program instructions to generate a set of all transactions and objects in the distributed SIP server environment; and
program instructions to select at least one transaction and one object from the set of all transactions and objects as candidates for detecting and resolving the deadlock in the distributed SIP server environment.

12. The method of claim 1, wherein the victimizing the first transaction at the first site further comprises victimizing at another end of the deadlock.

13. The method of claim 12, wherein the victimizing further comprises victimizing all transactions in the distributed SIP server environment.

14. The method of claim 13, further comprising counting a number of requests that reference the first object over a predetermined evaluation integral.

15. The method of claim 14, wherein the counting further comprises counting a number of requests that reference other objects in a distributed database over the predetermined evaluation integral.

16. The method of claim 15, further comprising counting the number of requests the first transaction has made for the first object during the predetermined evaluation integral.

17. The method of claim 16, further comprising generating a log of all deadlocks that occurred during the predetermined evaluation integral.

18. The method of claim 17, further comprising determining if the other objects in the distributed SIP server environment are crucial from a business perspective.

19. The method of claim 18, wherein the crucial objects are predetermined.

20. The method of claim 19, wherein a waiting period for a transaction for the crucial objects is reduced compared to a waiting time for non-crucial objects.

* * * * *